J. H. CARLOW.
CULTIVATOR.
No. 110,548. Patented Dec. 27, 1870.
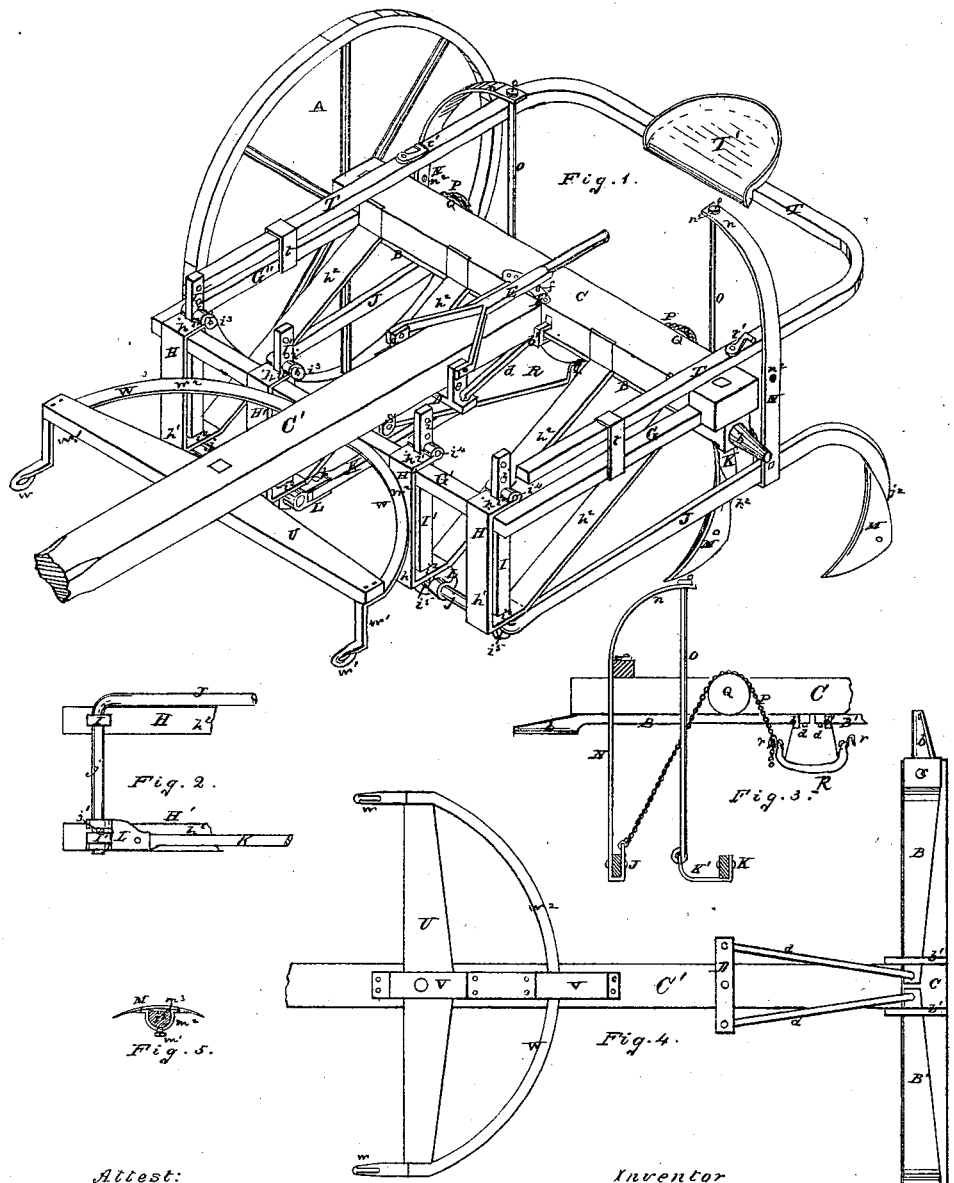

UNITED STATES PATENT OFFICE.

JOSEPH H. CARLOW, OF KIDDER, MISSOURI.

IMPROVEMENT IN CULTIVATORS.

Specification forming part of Letters Patent No. 110,548, dated December 27, 1870.

I, JOSEPH H. CARLOW, of Kidder, in the county of Caldwell and State of Missouri, have invented a certain new and useful Cultivator, of which the following is a specification:

My invention relates to a two-horse cultivator, having two pairs of adjustable shovels, and consists, more particularly, in the manner of connecting the plow or shovel beams to the frame so as to render them easily adjustable and removable; also, to the devices for raising the plows or shovels from the ground, and supporting them in that position.

Figure 1 is a perspective view of my improved cultivator. Fig. 2 is an under view of the connection of the plow-beams with the frame. Fig. 3 is a rear view, in elevation, of a portion of the implement, showing the apparatus for raising the shovels from the ground, the two sides of the implement being similar. Fig. 4 is an under view of the axle, tongue, and double-tree. Fig. 5 is a transverse section of the shovel and end of beam.

A is the right-hand wheel, the other being removed to show more clearly the structure of the implement, and leaving bare the spindle $b$. B B' are two levers constituting the axle. These levers are fulcrumed to the bolsters C, at $c$ $c$, and their inner ends connected by pitmen, $d$ $d$, to the ends of the lever D, which is pivoted at its mid-length to the lower side of the tongue C'. The lever D has two uprights, $e$ $e$, to whose upper ends are pivoted the ends of the forked lever E. The lever E has a stud, $f$, upon its under side, which, when the lever is depressed, enters one of a series of holes in a curved plate, F, attached to the top of the bolster. G G' G'' is a frame whose rear ends are attached to the bolster and whose front bar G' is attached to the lower side of the tongue. Attached to the top of the front bar G' of the frame is a series of flat bars, H H', whose upper ends $h$ extend backward over the bar G', and are turned to form an eye, $i^4$. From the portion $h$ depends a portion, $h^1$, whose lower end is turned backward, and ends in a brace, $h^2$, whose rear end is attached to the bolster. The horizontal portions of the bars H H' are slotted to receive vertical bars I I', whose upper ends occupy slots $i^1$, and whose lower ends occupy slots $i^2$. The upper ends of the bars I I' are pierced by a series of holes, $i$, for the reception of a pin, $i^3$, which traverses the eye $i^4$ in the upper end $h$ of the bars H H'. This arrangement admits the vertical adjustment of the bars I I'. The lower ends of the bars I I' have horizontal holes $i^5$, through which pass the rounded ends $j$ of the beams J. The portion $j$ of the beams J extends at right angles to the main portion, and passes through the holes $i^5$, as stated, the beam being capable of vertical oscillation. The two inner beams K are pivoted, at $k$, to straps L L, which are bent around the ends $j$ of the beams J, upon both sides of the bars I', thus giving the beams K universal motion on vertical pivots $k$ and horizontal pivots $j$. The rear ends $j^2$ $k^2$ of the beams J and K curve downward and incline forward, where they have a D-formed transverse section, the flat side being in front, and the shovels M have upon their rear side a similar D-formed socket, $m^2$, to receive the end of the beam. The socket $m^2$ is made larger than the ends $j^2$ $k^2$, to allow the shovel to be turned slightly to the right or left, so as to throw the earth mostly to or from the corn in plowing. The shovels are held upon the beams by set-screws, $m^1$, at the rear of the socket, and when inclined sidewise a small wedge, $m^3$, preferably of wood, is inserted between one side of the end $j^2$ or $k^2$ and the shovel, as shown in Fig. 5. The shovels are reversible, both ends being calculated to operate upon the ground; they are also vertically adjustable upon the ends of the beams. Ascending vertically from the beams J, near to the rear ends of the same, are uprights, N, whose upper ends, $n$, are curved over inward to a position vertically over the beams K, to which they are connected by rods O. The rods O are hinged to stirrups K' attached to the beams K, and the upper ends of the rods pass loosely through holes $n'$ in the curved ends $n$ of the uprights, and the rods O have heads $o$, which rest on the ends $n$ of the uprights, and serve to support the rear ends of the beams K, but to allow them upward and side movement, independently of the beams J and uprights N. P are chains, having one end attached near the rear ends of the beams J, and passing over pulleys Q, on the rear of the bolster, and having the other end adjustably engaged by the hook $r$ on the treadle R, whose front end is hinged by lugs S to the tongue C'. When the treadle R is depressed by the foot, the chains P are drawn over the pulleys Q, and raise the rear ends of both the outside beams J and the uprights N, and with them the beams K. T is a U-shaped bar or frame, to whose rear portion is attached the seat T'. The side bars of this frame lie upon the top of the bolster, and pass through staples $t\ t$, attached to the frame-bars G G''. This arrangement admits of the seat being adjusted backward or forward to balance the implement or to suit the legs of the rider. The stirrups K' upon the sides of the beams J receive the feet of the operator, and by this means he is able to guide the shovels M of the beams K. $t^1$ are hooks upon the side bars of the seat-frame T, and said hooks may be made to enter the holes $n^2$ in the uprights N, when the plows are raised from the ground to sustain them in that position. U is the double-tree, which is pivoted beneath the tongue, between the latter and a strap, V. W is a bar, having a curved rear part, $w^2$, playing between the tongue and the strap V, and serving to prevent the draft strain being communicated to the clevis-pin in such a manner as to bend it ; , the draft-points are, considerably below the level of the double-tree, and arranged as follows: The ends of the curved portion $w^2$ are attached to the ends of the double-tree, and and from these points depend continuations of the bar $w^1\ w^1$, ending in hooks or rings $w\ w$, for attachment of the whiffletrees.

The points of draft are depressed so as to relieve the horses' necks from the weight of the tongue, and also for any downward pressure that would be communicated to the tongue from the resistance of the earth to the plows. This might be accomplished by lowering the elevation of the frame; but this is inadmissible, as it is necessary that the frame should be of sufficient height to pass over the corn after it is four or more feet in height.

The points of draft might be depressed in another manner, namely, by attaching the whiffletrees directly to the frame; but this is inadmissible, as the implement would be rendered unsteady by the unequal draft of the horses, and even the irregularity caused to the animal in stepping would be communicated to the implement, so that it is held indispensable that the draft of the two horses should be balanced against each other, and communicated to a central point.

The devices for the attachment to the frame of the beams admit of their easy removal, as the part $j$ of the beam J is held in its sockets, $i^5$, by means of a single pin, $j^1$, which is inserted between one side or portion of the strap L and adjustable vertical bar I'; and upon the withdrawal of this pin the pintle $j$ can be drawn out of the sockets $i^5$ and the strap L, releasing both beams.

I claim as my invention—

1. The combination and arrangement of the beams J K, adjustable bars I I', pin $i^3$, strap L, and pin $j^1$, allowing the easy adjustment or removal of the beams, substantially as described.

2. The combination of the beams J K, upright N, rod O, chain or cord P, and treadle R, as and for the purpose described.

In testimony of which invention I hereunto set my hand.

JOSEPH H. CARLOW.

Witnesses:
SAML. KNIGHT,
STEPH. BERNARD.